United States Patent
Olsson et al.

(10) Patent No.: US 7,787,502 B1
(45) Date of Patent: Aug. 31, 2010

(54) PORT MULTIPLEXING APPARATUS AND METHODS

(75) Inventors: Fredrik Olsson, Los Altos, CA (US); Sebastian H. Ziesler, Los Gatos, CA (US); Med Belhadj, Ottawa (CA)

(73) Assignee: Cortina Systems Inc., Sunnyvale, CA (US)

( * ) Notice: Subject to any disclaimer, the term of this patent is extended or adjusted under 35 U.S.C. 154(b) by 760 days.

(21) Appl. No.: 11/477,663

(22) Filed: Jun. 30, 2006

(51) Int. Cl.
*H04J 3/02* (2006.01)
(52) U.S. Cl. .................. 370/535; 370/537; 370/542
(58) Field of Classification Search .................. 370/375, 370/376, 498, 535, 537, 542
See application file for complete search history.

(56) References Cited

U.S. PATENT DOCUMENTS

| | | | |
|---|---|---|---|
| 6,373,848 B1 * | 4/2002 | Allison et al. ............... | 370/401 |
| 6,781,985 B1 * | 8/2004 | Feder et al. ................. | 370/376 |
| 2003/0152087 A1 * | 8/2003 | Shahoumian et al. ....... | 370/401 |
| 2005/0036524 A1 * | 2/2005 | Wojtowicz .................. | 370/537 |

* cited by examiner

*Primary Examiner*—Jayanti K Patel
*Assistant Examiner*—Matthew Campbell

(57) ABSTRACT

Port multiplexing apparatus and methods are disclosed. Time slots in a time division multiplexing (TDM) scheme are allocated to transfer signals such as Ethernet or Fiber Channel packets associated with ports of a signal processing device. Signals associated with multiple ports are transferred between those ports and another signal processing device over a single logical link in accordance with the time slot allocation. An indication of the time slot allocation may also be transferred on the link, illustratively by replacing protocol overhead traffic to be transmitted on the link with allocation information. At a receiver, the replaced protocol overhead traffic may be substituted back into a received multiplexed signal. A port multiplexing apparatus may be controllable to operate in a multiplexing mode or in a non-multiplexing mode. Aspects of the invention may also be embodied in other forms, such as in a data structure stored on a machine-readable medium.

22 Claims, 9 Drawing Sheets

| Bit | MAC to PHY Connection | PHY to MAC Connection |
|---|---|---|
| 15 | 0 | 0 |
| 14 | ACK per 802.3 | ACK per 802.3 |
| 13:4 | 0 | 0 |
| 3 | 0 | Duplex Mode<br>1: Full Duplex<br>0: Half Duplex |
| 2:1 | 0 | Connection Speed<br>11: Reserved<br>10: 1000Mb/s<br>01: 100Mb/s<br>00: 10Mb/s |
| 0 | Connection Status<br>1: Enabled<br>0: Disbaled | Connection Status<br>1: Up<br>0: Down |

FIG. 3

PORT MULTIPLEXING APPARATUS AND METHODS

FIELD OF THE INVENTION

This invention relates generally to communications and, in particular, to interface apparatus and methods for transferring signals between communication signal processing devices.

BACKGROUND

In order to enable higher port-count components, Gigabit Ethernet (GE) Media Access Control (MAC) to physical layer (PHY) integrated circuit (IC) connections have evolved from wide parallel interfaces such as those defined in various specifications of the Institute of Electrical and Electronics Engineers (IEEE) to higher-speed narrower interfaces. Current state of the art communication devices use a single serial lane MAC-PHY connection per GE port, for example, and PHY devices typically come in densities of four and eight ports per chip. As switch ICs, MAC ICs, and other devices increase in bandwidth to 40 Gigabits per second (Gb/s) and beyond, the current techniques of using a separate PHY connections for each port is not economical and does not scale.

For devices that can support both high- and low-speed ports such as GE ports and 10GE ports, there is also an additional cost associated with providing respective different interfaces for the different port types. In accordance with conventional techniques, ten separate GE connections and one 10GE connection would be provided to a PHY device to allow a GE/10GE capable MAC device to be used in conjunction with ten GE ports or a single 10GE port. A standard interface architecture for enabling both port types does not currently exist.

Thus, there remains a need for improved interfaces and related interface techniques.

SUMMARY OF THE INVENTION

Embodiments of the present invention may be used to enable physical MAC device ports to connect to a single- or multi-port PHY device. A single 10GE MAC device port or ten GE MAC device ports could be connected to a PHY device through a single 10 GB/s link, for example. In this case, up to ten simultaneous 10/100/1000 Ethernet connections could be supported through a single logical interface and port, resulting in a reduction in pin and trace counts relative to conventional interface techniques.

In some embodiments, the invention adheres to existing 10GE electrical interface specifications and existing 10GE bit encoding.

According an aspect of the invention, there is provided an apparatus that includes a time slot allocation module and a multiplexing module. The time slot allocation module is operable to determine an allocation of time slots in a time division multiplexing (TDM) scheme to transfer Ethernet signals associated with ports of a signal processing device. The multiplexing module is operatively coupled to the time slot allocation module and is operable to transfer Ethernet signals associated with a plurality of the ports of the signal processing device between the plurality of ports and another signal processing device over a single local logical Ethernet link in accordance with the determined allocation.

The multiplexing module may be operable to transfer Ethernet signals by multiplexing the Ethernet signals for transmission on the Ethernet link. The Ethernet signals may be multiplexed by sequentially transmitting on the Ethernet link blocks of Ethernet signals received from respective ports of the plurality of ports.

The apparatus may also include a signalling module operatively coupled to the time slot allocation module and operable to transmit on the Ethernet link an indication of the determined allocation. The signalling module may transmit the indication by replacing Ethernet protocol overhead traffic to be transmitted on the Ethernet link with allocation information.

In some embodiments, the indication includes, for each time slot of a plurality of time slots, an identifier of a port allocated to the time slot, a sequence number of a next block of an Ethernet signal, associated with the port, to be transmitted in the time slot, and verification information for checking integrity of the identifier and the sequence number.

The multiplexing module may be operable to transfer Ethernet signals by demultiplexing the Ethernet signals from a multiplexed signal received on the Ethernet link and distributing the demultiplexed Ethernet signals to the plurality of ports in accordance with the determined allocation.

A signalling module operatively coupled to the time slot allocation module may receive on the Ethernet link an indication of the allocation. Where the indication replaces Ethernet protocol overhead traffic on the Ethernet link, the signalling module may be further operable to substitute the replaced Ethernet protocol overhead traffic back into the received multiplexed signal to replace the indication.

As noted above, the indication may include, for each time slot of a plurality of time slots, an identifier of a port allocated to the time slot, a sequence number of a next block of an Ethernet signal, associated with the port, to be transmitted in the time slot, and verification information for checking integrity of the identifier and the sequence number. The signalling module may be further operable to check the integrity of the identifier and the sequence number.

The multiplexing module may, in some embodiments, be operable to transfer Ethernet signals by multiplexing Ethernet signals received from the plurality of ports for transmission on the Ethernet link, and by demultiplexing Ethernet signals from a multiplexed signal received on the Ethernet link and distributing the demultiplexed Ethernet signals to the plurality of ports. The time slot allocation module may determine respective allocations for use in the multiplexing and the demultiplexing.

A method is also provided, and includes determining an allocation of time slots in a TDM scheme to transfer Ethernet signals associated with ports of a signal processing device, and transferring Ethernet signals associated with a plurality of the ports of the signal processing device between the plurality of ports and another signal processing device over a single local logical Ethernet link in accordance with the determined allocation.

Transferring may involve transmitting the Ethernet signals on the Ethernet link, in which case the method may also include transmitting an indication of the determined allocation on the Ethernet link. The indication could be transmitted by replacing Ethernet protocol overhead traffic to be transmitted on the Ethernet link with allocation information.

In some embodiments, transferring involves receiving the Ethernet signals on the Ethernet link. Determining may then involve receiving on the Ethernet link an indication of the allocation.

The indication may replace Ethernet protocol overhead traffic on the Ethernet link. In this case, the method may also include substituting the replaced Ethernet protocol overhead traffic back into a multiplexed signal received on the Ethernet link to replace the indication.

At least one of multiplexing Ethernet signals received from the plurality of ports for transmission on the Ethernet link, and demultiplexing Ethernet signals from a multiplexed signal received on the Ethernet link, may be involved in the transferring. The operation of determining may involve determining respective allocations for use in the multiplexing and the demultiplexing.

The method may be embodied, for example, in instructions stored on a machine-readable medium.

A machine-readable medium storing a data structure is also provided. The data structure includes identifiers of a plurality of ports of a signal processing device, and identifiers of respective time slots in a TDM scheme in which Ethernet signals associated with the identified ports are to be exchanged with another signal processing device over a single local logical Ethernet link.

According to another aspect of the invention, an apparatus includes a multiplexing module operable to transfer signals, associated with a plurality of ports of a signal processing device, to another signal processing device through a single logical link in accordance with a time slot allocation in a TDM scheme, and a mode controller, operatively coupled to the multiplexing module and to a further port of the signal processing device, operable to control an operating mode of the apparatus. The mode controller allows transfer of a multiplexed signal comprising the plurality of signals between the link and the multiplexing module in a first operating mode, and allows transfer of a signal between the link and the further port in a second operating mode.

The apparatus may also include a selector operatively coupled to the multiplexing module, to the mode controller, and to the further port. The mode controller may then control an operating mode of the apparatus by controlling the selector to transfer either the multiplexed signal between the link and the multiplexing module or the signal between the link and the further port.

Another aspect of the invention provides an apparatus that includes a time slot allocation module operable to dynamically determine an allocation of time slots in a TDM scheme to transfer signal packets associated with ports of a signal processing device, a signalling module operatively coupled to the time slot allocation module and operable to transfer on a logical link an indication of a current allocation, and a multiplexing module operatively coupled to the time slot allocation module and operable to transfer packets associated with a plurality of the ports between the plurality of ports and the logical link in accordance with the current allocation.

Where the link supports a transfer protocol, the signalling module may be operable to transfer the indication by replacing protocol overhead traffic to be transmitted on the link with allocation information.

The signalling module may also or instead be operable to transfer the indication by receiving the indication on the link. In this case, the indication may replace protocol overhead traffic in a transfer protocol supported by the link, and the signalling module may be further operable to substitute the replaced protocol overhead traffic back into the received multiplexed signal to replace the indication.

In some embodiments, the indication comprises, for each time slot of a plurality of time slots, an identifier of a port allocated to the time slot, a sequence number of a next packet of a signal, associated with the port, to be transmitted in the time slot, and verification information for checking integrity of the identifier and the sequence number.

The multiplexing module may be operable to transfer packets by at least one of: multiplexing the packets for transmission on the link, and demultiplexing the packets from a multiplexed signal received on the link for distribution to the plurality of ports in accordance with the current allocation. The time slot allocation module may dynamically determine respective allocations for use in the multiplexing and the demultiplexing.

The packets may be Ethernet packets in some embodiments. Handling of Fibre Channel packets by the multiplexing module is also contemplated.

A method is also provided, and includes dynamically determining an allocation of time slots in a TDM scheme to transfer signal packets associated with ports of a signal processing device, transferring on a logical link an indication of a current allocation, and transferring packets associated with a plurality of the ports between the plurality of ports and the logical link in accordance with the current allocation.

Other aspects and features of embodiments of the present invention will become apparent to those ordinarily skilled in the art upon review of the following description.

BRIEF DESCRIPTION OF THE DRAWINGS

Examples of embodiments of the invention will now be described in greater detail with reference to the accompanying drawings.

FIG. 3 shows a table representing an example of encoding that may be implemented by the coders 34 of FIG. 2.

DETAILED DESCRIPTION OF PREFERRED EMBODIMENTS

Figure 1:
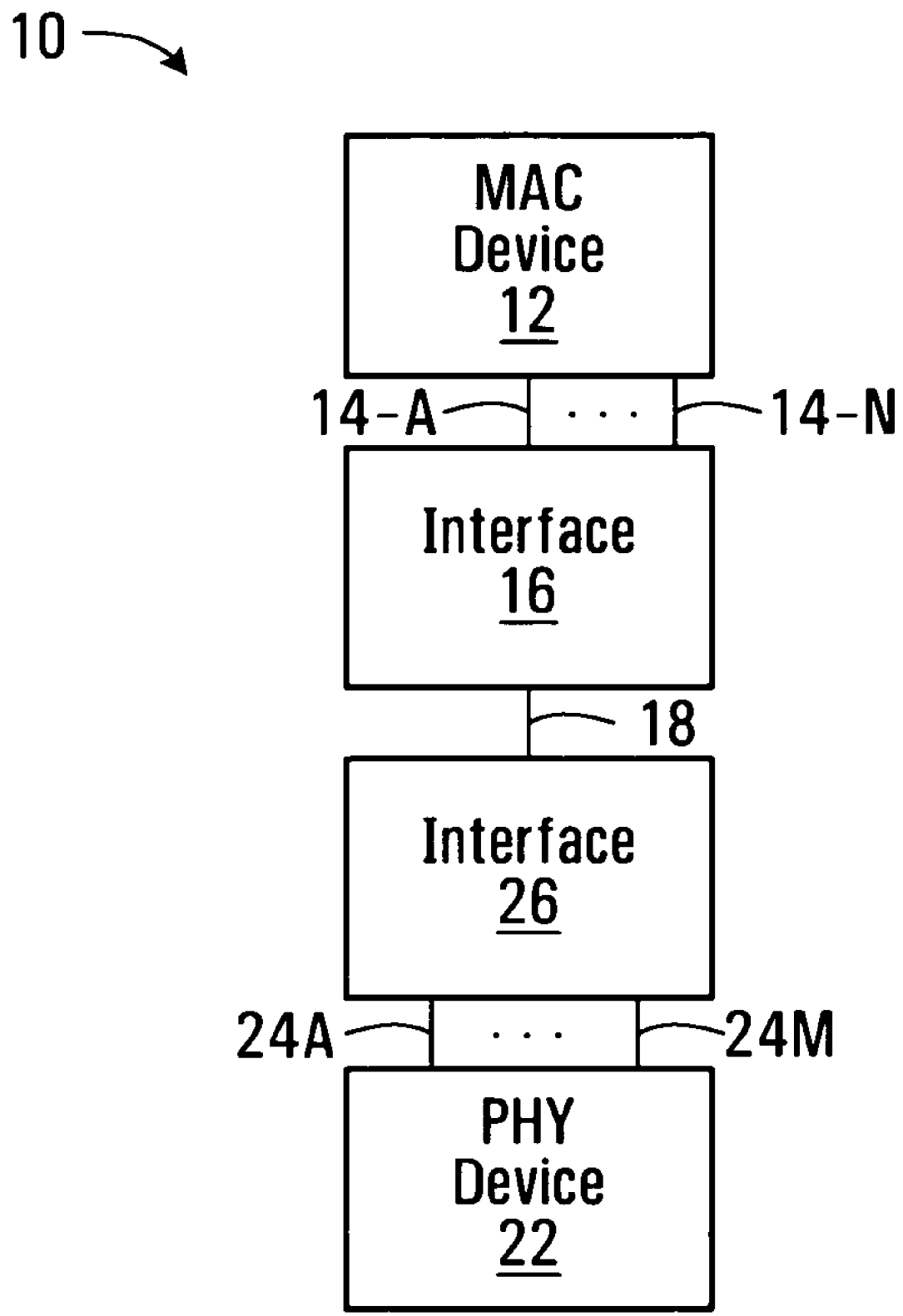
FIG. 1 is a block diagram of an embodiment of the invention implemented in conjunction with MAC and PHY devices.

FIG. 1 is a block diagram of an embodiment of the invention implemented in conjunction with MAC and PHY devices. The arrangement 10 of FIG. 1 includes a MAC device 12, an interface 16 operatively coupled to the MAC device via multiple connections 14A through 14N, an interface 26 operatively coupled to the interface 16 through a single logical link 18, and a PHY device 22 operatively coupled to the interface 26 through multiple connections 24A through 24M.

Although a communication device that includes MAC and PHY devices such as 12, 22 may also include other components, these components have not been explicitly shown in FIG. 1 so as to avoid overly complicating the drawing. The division of functions as shown in FIG. 1 is also illustrative, and not intended to limit the present invention. The interfaces 16, 26 could be integrated into MAC and PHY chips that implement the MAC and PHY devices 12, 22 or incorporated into a single interface device, for example. It should therefore be appreciated that the arrangement of FIG. 1, as well as the contents of the other drawings, are intended solely for illustrative purposes, and that the present invention is in no way limited to the particular example embodiments explicitly shown in the drawings and described herein. In general, embodiments of the invention may be implemented using fewer, further, or different components or functions, with similar or different interconnections, than shown.

Those skilled in the art will be familiar with many examples of MAC and PHY devices 12, 22. MAC devices generally perform signal processing operations associated with Layer 2 of the Open Systems Interconnection (OSI) reference model, whereas PHY devices perform line interface signal processing operations associated with the physical layer, Layer 1. MAC and PHY devices are illustrative examples of communication signal processing devices. The present invention, however, is not in any way limited to providing an interface between MAC and PHY devices only.

As noted above, the MAC and PHY devices 12, 22, and similarly other types of signal processing devices, may have multiple ports for receiving and/or transmitting electronic signals. The connections 14A through 14N are operatively coupled, either directly or indirectly, to ports of the MAC device 12. In some embodiments, the MAC device 12 has N ports, and thus one connection 14 is provided per port. The connections 24A through 24M may similarly be per-port connections operatively coupled to ports of the PHY device 22. Although the MAC device 12 and the PHY device 14 will usually have the same number of ports, such that N=M, it is also contemplated that the devices may have different numbers of ports.

The actual connections 14, 18, 24 may include wired connections such as conductive traces on a circuit board for connecting pins of separate integrated circuits. Other types of connections, including but not limited to indirect connections, wireless connections, and logical connections over one or multiple physical connections, are also contemplated. The functions of the interfaces 16, 26 may be implemented in software for execution by a processing element, for instance, in which case at least the connections 14, 24 might be provided as indirect connections through variables and/or signal buffers rather than direct physical connections.

An illustrative example of an interface 16, 18 is described in further detail below. In operation, each of the interfaces 16, 18 may transfer signals between multiple ports of a signal processing device, the MAC device 12 or the PHY device 22 in the arrangement 10, and the single, local, logical link 18 to another device. This transfer may be supported for one or both directions between the MAC and PHY devices 12, 22.

Figure 2:
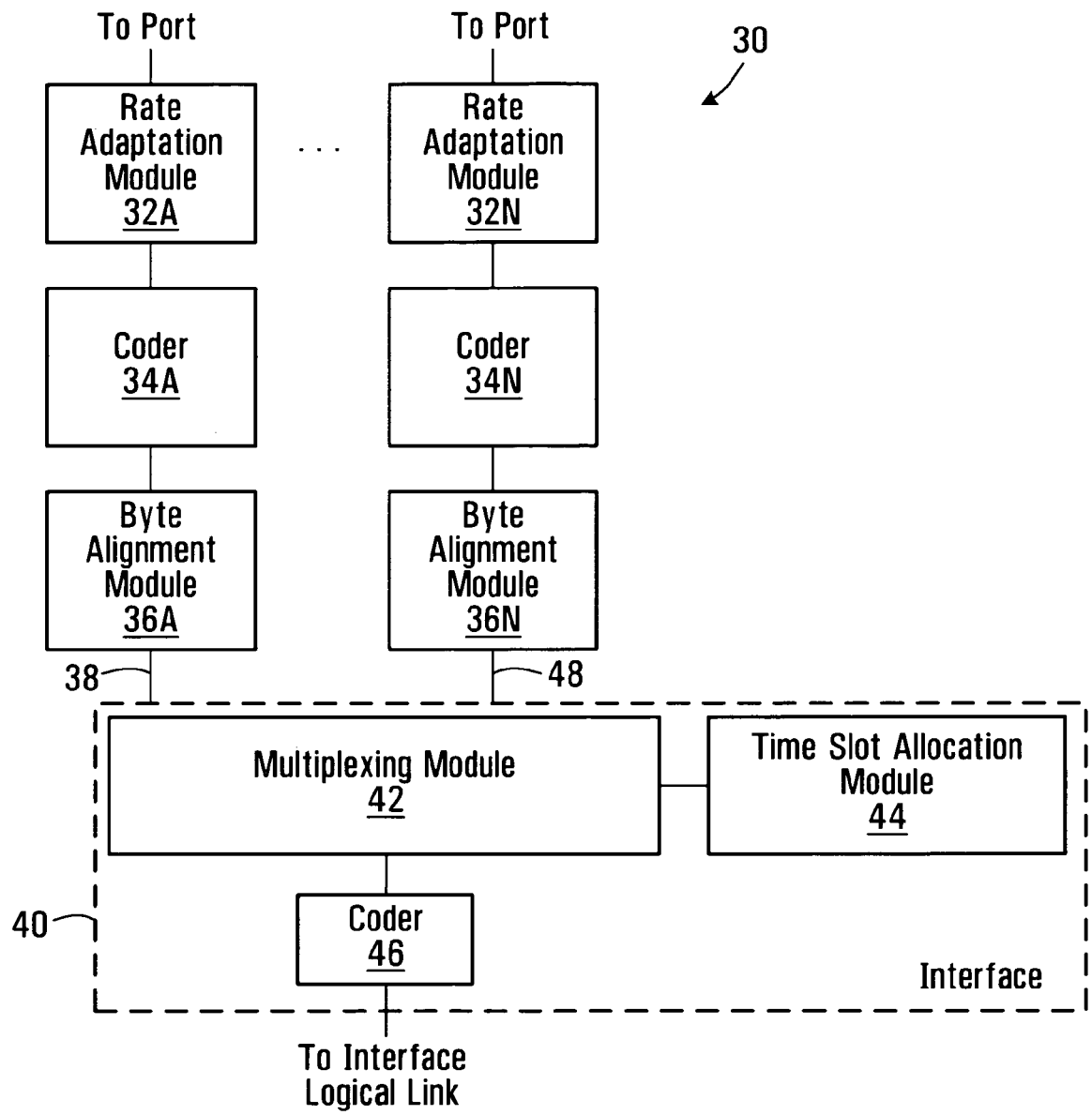
FIG. 2 is a block diagram illustrating an interface of an embodiment of the invention in more detail.

The structure and operation of an example of an interface according to an embodiment of the invention will now be considered in detail with reference to FIG. 2. The arrangement 30 shown in FIG. 2 includes per-port signal processing components 32A through 32N, 34A through 34N, 36A through 36N, and an interface 40 operatively coupled to ports indirectly, via connections 38A through 38N and the per-port processing components. The interface 40 includes a multiplexing module 42, a time slot allocation module 44 operatively coupled to the multiplexing module 44, and a coder 46 operatively coupled to the multiplexing module and to the time slot allocation module.

Those skilled in the art will be familiar with the per-port components 32, 34, 36, which might be substantially similar to conventional MAC device components. These components are therefore described only briefly herein, to the extent necessary to illustrate embodiments of the invention. The components of the interface 40 implement embodiments of the invention, and accordingly are described in significant detail.

The per-port rate adaptation modules 32 may in some embodiments be used to adapt per-port traffic rates to one or more desired traffic rates. In a transmit direction, in which signals received on a MAC port are to be transmitted to a PHY device, a 100 Megabit per second (Mb/s) Fast Ethernet MAC port could be matched to a GE rate of 1 Gb/s by replicating each byte received from the port ten times. Every tenth byte could be sampled by a rate adaptation module 32 in the opposite receive direction. Similar operations could be performed for a 10 Mb/s Ethernet port, although with hundred-byte transmit replication and hundredth-byte receive sampling. These rate adaptation operations might be implemented where the interface 40 transfers multiple GE streams in a single multiple-GE stream, for example. It should be noted, however, that rate adaptation, bit/byte stuffing, and analogous techniques might not be implemented in every embodiment of the present invention. For instance, where the MAC ports are GE ports in the above example of a GE desired speed, the rate adaptation modules 32, if provided at all, may simply pass frames received from the MAC ports transparently, without performing any sort of rate adaptation.

According to one embodiment of the invention, each per-port coder 34 implements Physical Coding Sublayer (PCS) coding, illustratively 1000 Base-X 8B/10B PCS coding, with which those skilled in the art will be familiar.

The coders 34 may also perform auto negotiation of interface characteristics by exchanging with another interface apparatus information associated with a current mode of operation. FIG. 3 shows a table representing an example of encoding that may be implemented by the coders 34. Information such as duplex mode, speeds, and status for each port connection 14, 24 (FIG. 1) and each direction may be exchanged using the coding scheme of FIG. 3.

The particular coding scheme shown in FIG. 3 illustrates a redefinition of bits that are defined as part of the IEEE 802.3 specification, which is publicly available from the IEEE. Using the coding scheme of FIG. 3, devices that communicate through an interface 40 can exchange and negotiate capabilities and configurations through a well defined, standardized protocol. This can be advantageous in that a known protocol is used for a new purpose, without entirely redefining the protocol itself. Although the information exchanged between devices is different than in conventional implementations, the transfer of this information can be accomplished in accordance with a known protocol.

In the arrangement 30, two encoding schemes are applied to communication signals. The coders 34, as described above, may apply 8B/10B coding. A different 64B/66B coding scheme may be applied by the coder 46. In some embodiments, the coding scheme applied by the coder 46 has a restriction that the start of a frame has to occur on a multi-byte word boundary, illustratively an 8-byte boundary. The byte alignment modules 36 provide for this alignment, which might not be necessary in every embodiment of the present invention.

Figure 4:
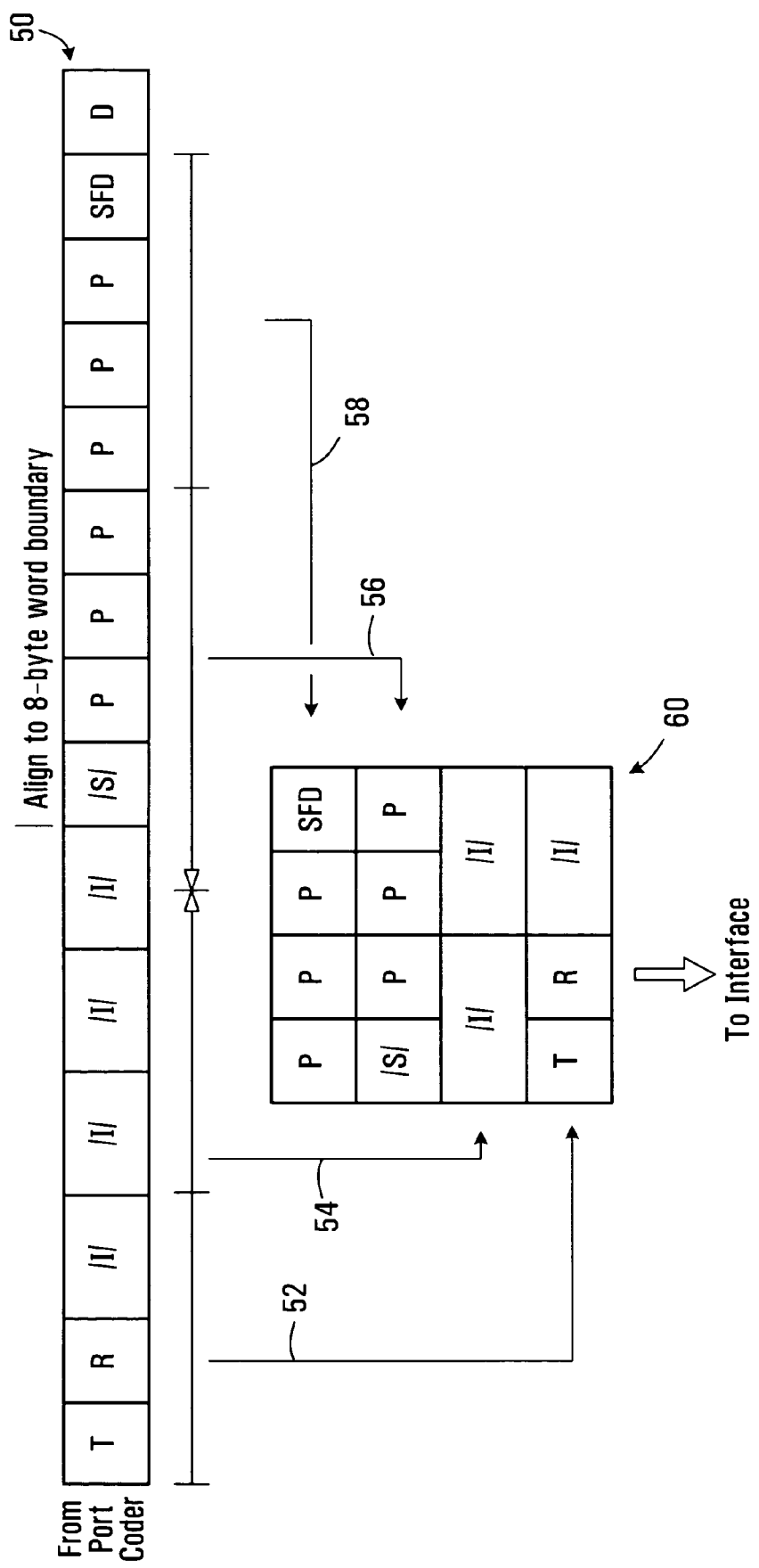
FIG. 4 is a block diagram showing an example of a byte alignment scheme.

FIG. 4 is a block diagram showing an example of a byte alignment scheme. According to this illustrative example scheme, inter-frame gaps /I/ in a port coder output stream 50 are stretched or reduced to align each start of frame character /S/ with the first byte of a 64B/66B data word. This may be accomplished using an 8-byte buffer function for instance.

The example shown in FIG. 4 also illustrates at 52, 54, 56, 58 a parallel conversion of a Terminate code T, a Skip code R, Preamble bytes P, and a Start of Frame Delimiter SFD of the serial stream 50 to a parallel stream 60. By stretching or shortening the inter-frame gaps /I/, the SFD, which precedes a Data byte D, falls at an 8-byte boundary.

This conversion as shown might be useful where the multiplexing module 42 outputs port signals to a link in 4-byte blocks, for example, but need not necessarily be performed in all embodiments of the invention.

In the interface 40, the multiplexing module 42, the time slot allocation module 44, and the coder 46, like the other components shown in FIG. 2, may be implemented in hardware, software, firmware, or combinations thereof. Software implementing the functions of any or all of these components might be stored in a memory (not shown) for execution by one or more processing elements such as microprocessors, microcontrollers, Programmable Logic Devices (PLDs), Field Programmable Gate Arrays (FPGAs), Application Specific Integrated Circuits (ASICs), and other types of "intelligent" integrated circuits or devices.

In operation, the time slot allocation module 44 determines an allocation of ports to time slots in a TDM scheme. This determination might be based on user inputs, speed capabilities of the ports, and/or configurations of the ports. Where the multiplexing module 42 is configured at deployment to apply a particular TDM scheme and time slot allocation to its ports, for example, the time slot allocation module 44 might access a memory (not shown) in which multiplexing configuration information is stored. Time slot allocation could also or instead be dynamic in some embodiments.

Although shown as two separate blocks in FIG. 2, the determination function of the time slot allocation module 44 may be integrated with the multiplexing module 42 into a multiplexer, or inherent in the operation of a multiplexer if the multiplexer is configured to use a predetermined time slot allocation. References herein to separate multiplexing and time slot allocation modules should be interpreted accordingly.

The multiplexing module 42 transfers signals between multiple ports of one signal processing device and a single local logical link to another device in accordance with the allocation determined by the time slot allocation module 44. This transfer may involve multiplexing signals, illustratively Ethernet or Fiber Channel packets, received from the ports for transmission on the link, demultiplexing a multiplexed signal received on the link, or both.

Figure 5:
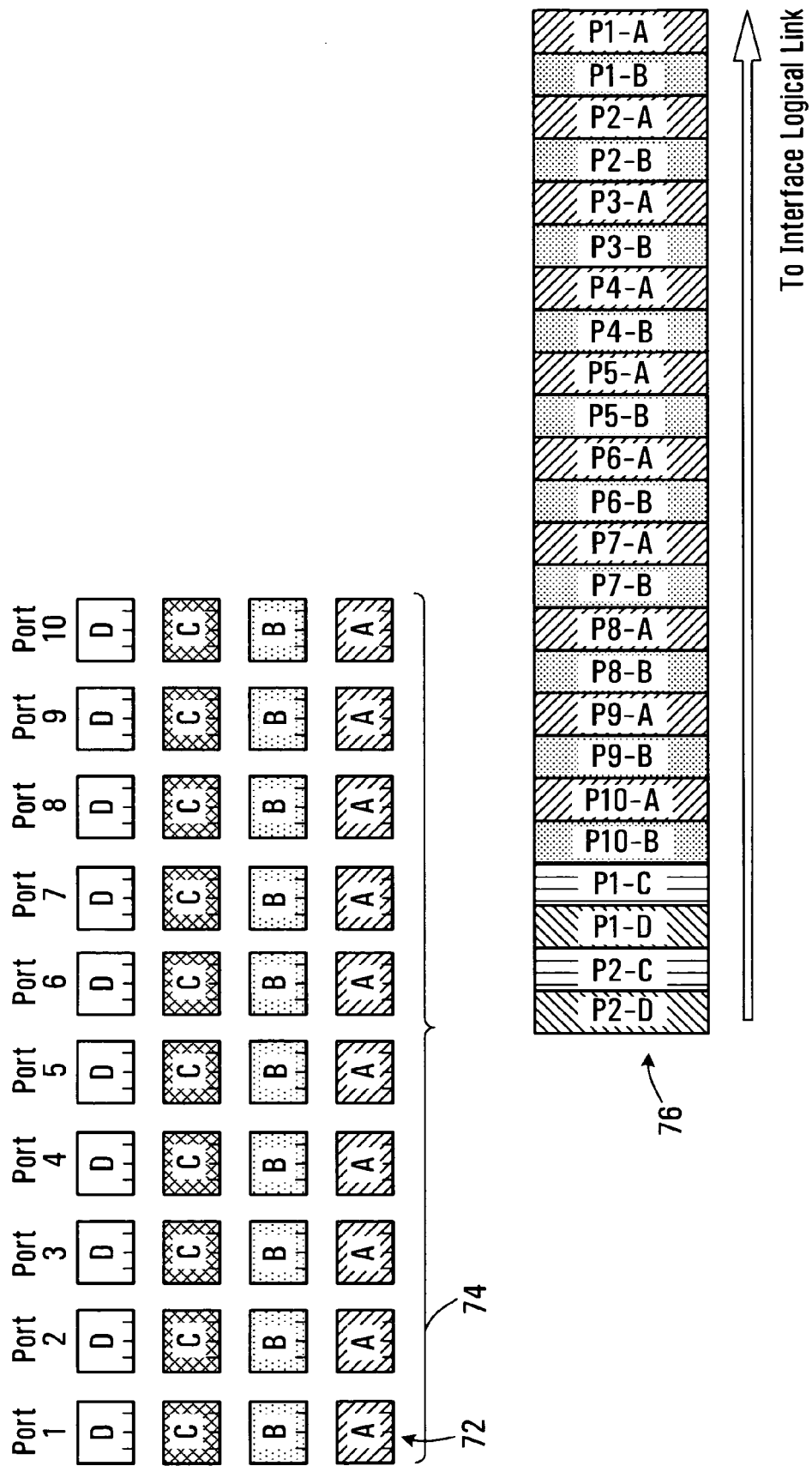
FIG. 5 is a block diagram illustrating an example of a time slot allocation.

In a transmit direction, the multiplexing module 42 could multiplex signals by sequentially transmitting blocks of signals, which are received from respective ports, on the link. FIG. 5 is a block diagram illustrating an example of this type of time slot allocation.

According to the time slot allocation shown in FIG. 5, a communication signal stream 72 that include blocks A, B, C, D is received from each of ten ports. In the system of FIG. 2, these blocks would be output from the byte alignment modules 36.

The multiplexing module 42 in this example multiplexes eight bytes from each port for transmission on the link sequentially, as represented at 74, 76. Two four-byte blocks A, B from port 1 are transmitted, followed by two four-byte blocks from port 2, and so on, such that each port is served in this round-robin fashion, eight bytes at a time. One or more queues, buffers, or other link stores could be provided, as per-port stores and/or a single link store, to facilitate this process.

It should be appreciated that other allocations are also contemplated. Different ports that have different speeds, for example, might be assigned different numbers of time slots. Round-robin port servicing is similarly intended for illustrative purposes. Other embodiments of the invention may use prioritized, weighted, or otherwise asymmetrical port to time slot allocations.

In general, the particular time slot allocation used in an application may be designed on the basis of the number of time slots available and the number of ports to be multiplexed.

Referring again to FIG. 2, the coder 46, like the coders 34, may apply a conventional coding scheme such as 10 GBASE-R PCS coding, to a multiplexed signal output by the multiplexing module 42.

A coded multiplexed signal is output from the coder 46 to a local logical link, either directly or through additional components such as a Physical Medium Attachment (PMA). PMAs often perform such additional functions as serializing and deserializing data streams, transmitting and receiving serial data streams on one or more differential pin pairs, and recovering a clock from an incoming data stream.

Differential transmission and reception as noted above illustrate the fact that a single local logical link over which multiplexed signals are transferred need not necessarily include only one physical connection. Common 10 Gb/s single logical links, for example, include XFI, which is a serially transmitted 10 Gb/s link, and XAUI, which is a single logical link over four physical connections (i.e., a 4-lane link) having a speed of 3.125 Gb/s per connection.

Thus, in the above examples, a local logical link used to transfer multiplexed signals between signal processing devices may include a single physical connection, as for XFI, two conductive traces or lines in the case of a differential pin pair, or four physical connections for XAUI. Other types of logical links in conjunction with which embodiments of the invention could potentially be implemented may involve different numbers of physical connections.

The coder 46 might also be used in accordance with an embodiment of the invention to support other functions. For example, the operation of a standard coder could be modified to provide a coder 46 that also acts as a signalling module for transmitting and/or receiving indications of determined allocations on a link.

According to one embodiment, an inter-device link supports a particular transfer protocol, and an indication of a current time slot allocation is transmitted by replacing protocol overhead traffic to be transmitted on the link with allocation information. Allocation information could be transferred over an interface logical link before multiplexed traffic is first transferred on the link, during link configuration for example, or whenever a time slot allocation changes, as in the case of a dynamic allocation scheme.

Consider an example of an Ethernet link between MAC and PHY devices, and an interface that encodes 8-byte 8B/10B encoded words from Gigabit Media Independent Interface (GMII) MAC device ports using IEEE 802.3ae 64B/66B encoding. A standard 64B/66B coder in this case could be modified to replace protocol overhead traffic, specifically GE idle two-byte code groups, shown as /I/ in FIG. 4, with allocation information.

Allocation information according to one embodiment of the invention is transferred in four-byte ordered sets. For example, to enable a receiver to detect the location of each port's signals the Ethernet block types:

BT=0x1e (C0,C1,C2,C3,C4,C5,C6,C7)
BT=0x33 (C0,C1,C2,C3,S4,D5,D6,D7)
BT=0x2d (C0,C1,C2,C3,O4,D5,D6,D7)

may be replaced with the block types:

BT=0x4b (O0,D1,D2,D3,C4,C5,C6,C7)
BT=0x66 (O0,D1,D2,D3,S4,D5,D6,D7)

BT=0x55 (O0,D1,D2,D3,O4,D5,D6,D7).

The above substitution replaces 4 idle word by an ordered set (O0,D1,D2,D3) so as to relay port mapping information per time slot. The content of the D1, D2, D3 bytes in any time slot, according to one embodiment, is as follows:

D1 is an identifier of a port allocated to the time slot;
D2 is a sequence number of a next block to be transmitted for a port, which may wrap around from 255 to 0; and
D3 is an 8-bit Cyclical Redundancy Check (CRC) code calculated over D1 and D2.

A transmitting coder 46 need not replace every idle word on a link, and may instead replace one word every X words. The replacement index or rate X may be configurable, and/or set to a default value such as 2048 words.

In the preceding example signalling scheme, time slot/port allocation may be detected by the time slot allocation module 44 at a receiving device when a predetermined or possibly configurable number of successive ordered sets for all ports have been detected. A correct ordered set in the above example will have a correct CRC, the same port number for the same TDM slot, and a correct sequence number.

Such a multiple-set detection threshold provides a level of redundancy protection against incorrect allocation detections.

A receiver may detect a loss of time slot alignment when a number of successive ordered sets are incorrect. The number of ordered set errors at which loss of alignment is detected may or may not be the same as the number of correct sets used to detect time slot/port allocations and thus time slot alignment. Alignment may also or instead be declared lost when a loss of signal or other error condition is detected.

At a receiving device, the coder 46 might also substitute back an original code word for an ordered set. This reverse substitution can be performed, for example, when replaced protocol overhead information is already known or otherwise available at the receiver. Reverse substitution is not performed if an ordered set does not include allocation information. A received word could then be passed as is, ensuring the correct processing of other types of ordered sets.

The above example represents one signalling technique for relaying allocation information between devices using a coder. Other implementations, using a different form of signalling module such as a separate signalling module that is operatively coupled to the time slot allocation module 44, are also possible.

It should also be appreciated that the invention is not limited to this or any other particular allocation information for providing indications of a current time slot allocation. The integrity of information may be checked using other forms of verification information than a CRC code, for instance. Time slot allocations may also or instead be conveyed in different forms of information than port identifiers and sequence numbers. Further variations may be or become apparent to those skilled in the art.

Other than the example signalling scheme, embodiments of the invention have been described above primarily in the context of a transmit direction. Inverse operations may be performed in a receive direction.

As noted above, the coder 46 may detect and substitute allocation information in a received multiplexed signal. Detected allocation information may be passed to the time slot allocation module 44 for determining a time slot allocation used to generate the received signal. The multiplexing module 42 demultiplexes port signals from the received multiplexed signal and distributes the demultiplexed port signals to the corresponding ports, in accordance with the determined allocation, on the connections 38A through 38N.

The same interface may support both transmit and receive operations. The multiplexer 42 may be capable of both multiplexing communication signals received from multiple ports for transmission on a link and demultiplexing signals from a multiplexed signal received on the link. The same allocation or different allocations may be determined and applied in the transmit and receive directions in some embodiments.

The per-port components 32, 34, 36 in the arrangement 30 of FIG. 2 are also somewhat specific to MAC devices, and accordingly it should be appreciated that different per-port components might be provided in other embodiments, when an interface is implemented in conjunction with a PHY device or some other type of signal processing device.

Figure 6:
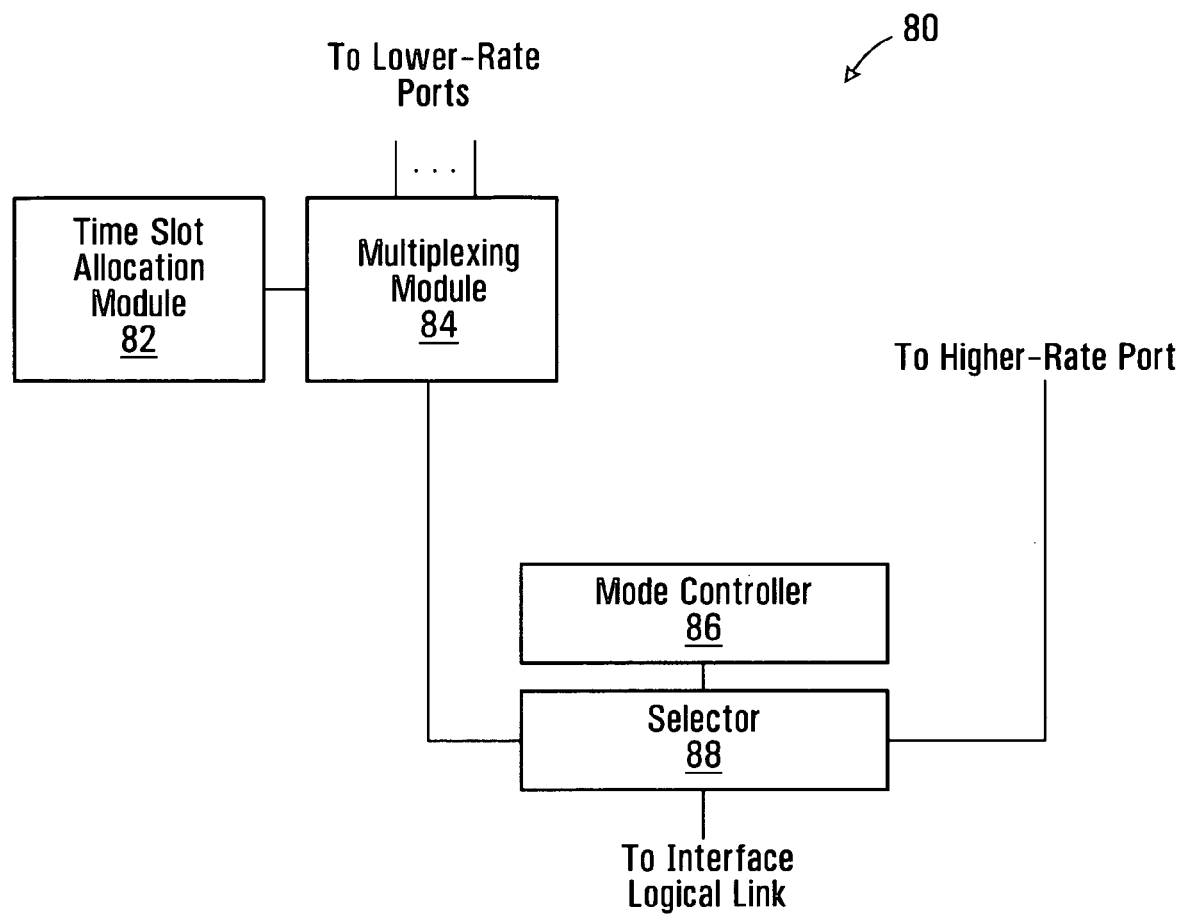
FIG. 6 is a block diagram of an interface according to another embodiment of the invention.

According to a further aspect of the invention, the same interface has multiplex and non-multiplex modes of operation. In the multiplex mode, signals associated with multiple ports are transferred on a single link as described above. The non-multiplex mode supports transfer of signals between a single port and the same link. FIG. 6 is a block diagram of an interface according to another embodiment of the invention in which these modes of operation are supported.

The interface 80 includes a time slot allocation module 82, a multiplexing module 84 operatively coupled to the time slot allocation module, a selector 88 operatively coupled to the multiplexing module, and a mode controller 86 operatively coupled to the selector.

In respect of a complete implementation, a signal processing device in conjunction with which the interface 80 is implemented may include other components that have not been explicitly shown in FIG. 6. Per-port components such as those shown in FIG. 2 may be provided for each port to which the multiplexing module 84 and the selector 88 are to be operatively coupled, for example. It should thus be appreciated that the interface 80 may be implemented in substantially the same way as the interface 40 (FIG. 2), described above. The interface 80, however, has multiple modes of operation.

The time slot allocation module 82 and the multiplexing module 84 may be the same as the corresponding components of the interface 40 (FIG. 2). The mode controller 86 implements a control function for selecting either a multiplexed signal generated by the multiplexing module 84 or a non-multiplexed signal from a single higher-rate port of the same signal processing device for transfer on a single local logical link.

A MAC device might have ten GE ports and an additional, single 10GE port for instance. Either a multiplexed signal including signals from all ten of the GE ports or a non-multiplexed signal from the single 10GE port could be transferred over one 10 Gb/s link to a PHY device. The mode controller 86 and the selector 88 allow one or the other of these modes to be selected.

Control of the operating mode of the interface 80 by the mode controller 86 may be implemented in any of various ways. As shown in FIG. 6, one possible implementation is to provide the selector 88, illustratively a switch, that is controllable by the mode controller 86 to transfer either a multiplexed signal between a link and the multiplexing module 84 or a signal between the same link and the higher-rate port.

Multiplex and non-multiplex modes could instead be controlled by controlling operation of a multiplexing module directly. All ports of a device could be operatively coupled to a multiplexing module, for example, with the operation of that module being controlled either to multiplex multiple port signals or to output a single port signal. The function of the selector 88 is then effectively integrated with a multiplexing module.

An operating mode could be selected when the interface 80 is first deployed and a designer is aware of the particular application for which the interface is to be used. Variable or adaptive control schemes are also contemplated, in which the operating mode can be varied depending on the specific ports on which signals are received, for example. The mode controller 86 could detect port types and/or received signals and control the selector 88 accordingly.

Further options for providing multi-mode functionality may be or become apparent to those skilled in the art.

Figure 7:
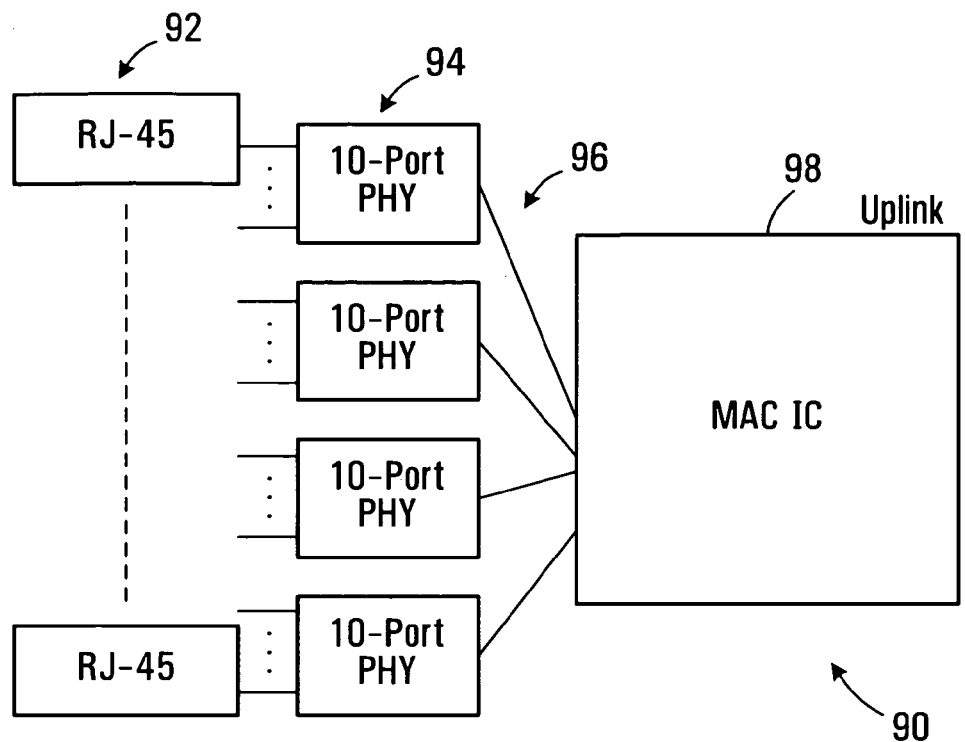
FIGS. 7 to 9 are block diagrams illustrating respective applications of embodiments of the invention to different port types.
Figure 8:
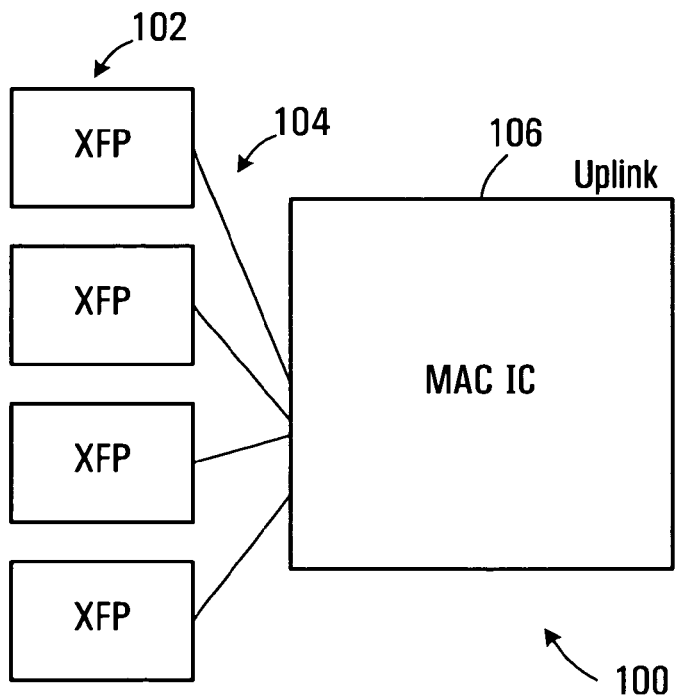
Figure 9:
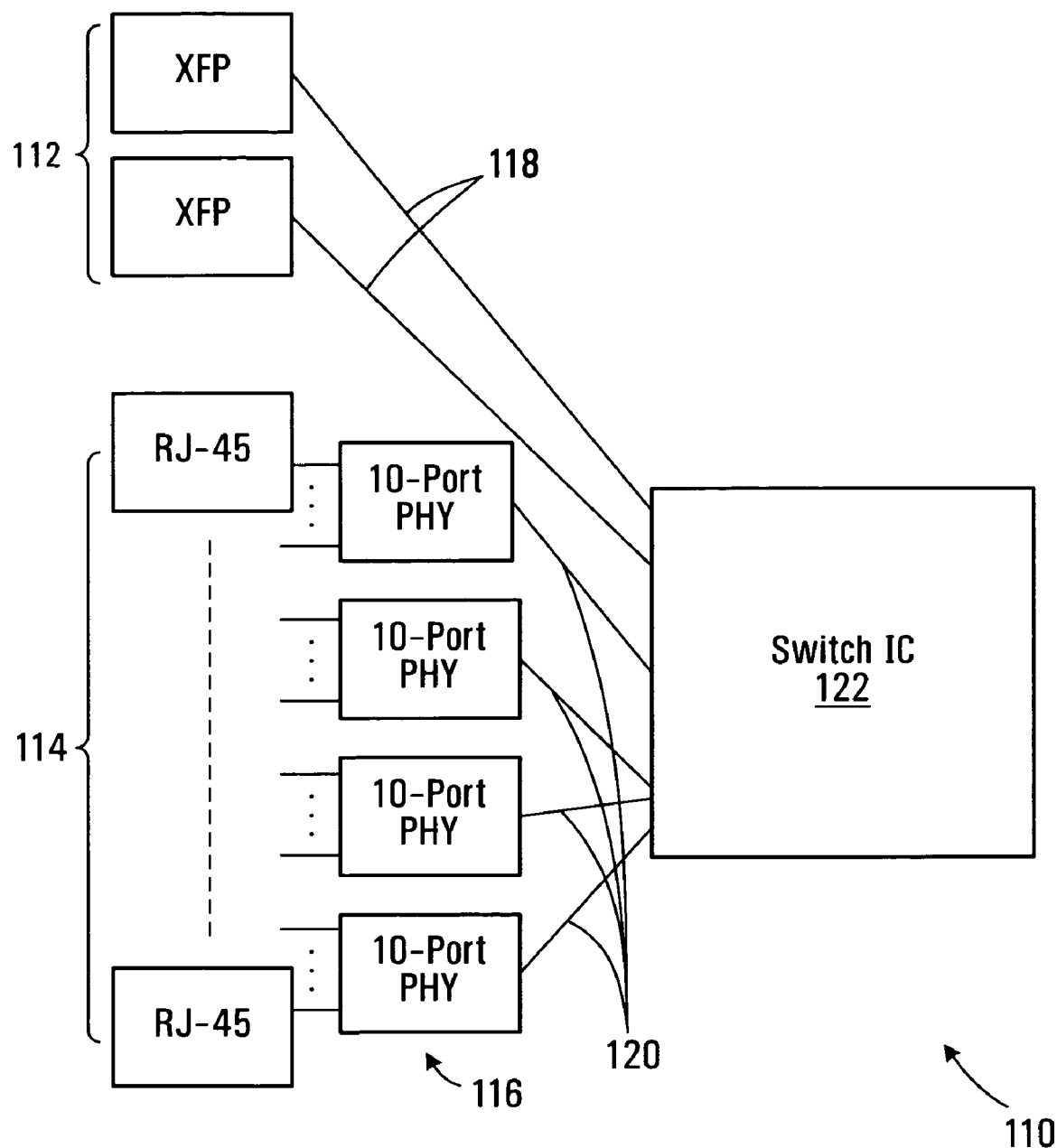

FIGS. 7 to 9 are block diagrams illustrating respective applications of embodiments of the invention to different port types.

In the arrangement 90 of FIG. 7, which may be a 40-port 10/100/1000 Ethernet line card for instance, RJ-45 connectors 92 allow communication lines to be connected to the ports of each of four 10-port PHY devices 94. Those skilled in the art will be familiar with RJ-45 connectors. An interface at each PHY device 94 and corresponding interfaces at the 40 Gb/s MAC IC 98 allow each PHY device to be connected to the MAC IC via a respective single 10 Gb/s link 96.

FIG. 8 shows an implementation 100, illustratively a 4-port 10GE line card, in which four optical 10GE XFP ports 102 are connected to the MAC IC 106, which may be the same MAC IC as in FIG. 7, via four links 104. Those skilled in the art will also be familiar with XFP ports. By integrating a multi-mode interface into a MAC IC, the same IC may be used in either of the arrangements 90, 100 with the same four 10GE links 96, 104.

In both of the arrangements 90, 100, IC and board cost can be lowered by reducing forty serial connections, which would be provided in accordance with conventional techniques, to 4, while enabling the same chip to support both GE and 10GE ports.

The arrangement 110 of FIG. 9 includes a combination of port types, specifically forty RJ-45 connectors 114 coupled to four 10-port PHY devices 116, and two 10GE XFP ports 112. The two XFP ports 112 and the four PHY devices 116 are connected to the 60 Gb/s switch IC 122 through respective 10GE connections 118, 120. In one embodiment, at least the connections 118 are coupled to multi-mode interfaces. The interfaces at the PHY devices 112 and the switch IC 122 need not necessarily be multi-mode interfaces. However, providing all of the interfaces at the switch IC 122 as multi-mode interfaces may provide the most flexibility in terms of port connections, since multi-mode interfaces would allow any of the switch interface links to be connected to multiple GE PHY ports or to a single 10GE PHY port.

The applications shown in FIGS. 7-9 are intended for illustrative purposes. Embodiments of the invention may be implemented with different types and/or numbers of connectors, ports, and processing devices than shown.

Figure 10:
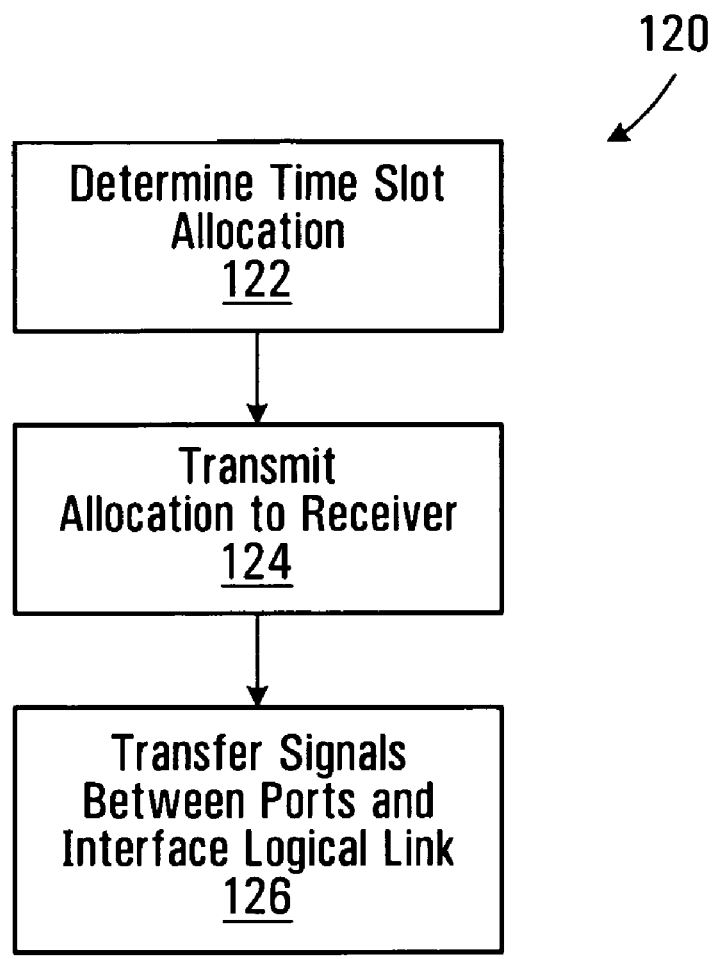
FIG. 10 is a flow diagram illustrating a method according to an embodiment of the invention.

FIG. 10 is a flow diagram illustrating a method according to an embodiment of the invention. The method 120 begins at 122 with an operation of determining an allocation of ports of a signal processing device to time slots in a TDM scheme. At 124, the determined allocation may be transmitted to a receiver on the same link over which the signals are to be transmitted. This operation might only be performed in a transmit direction. Transmission of allocation information, and other configuration operations, might also only be performed when the link is first being set up for signal transfers.

Signals are transferred between multiple ports of the device and a single logical link at 126, in accordance with the determined allocation. Where multi-mode operation is supported, the transfer at 126 may be between a link and either a single port or multiple ports.

Other embodiments of the invention may involve performing the illustrated operations in different ways, varying the order in which the operations are performed, and/or performing fewer or additional operations.

For example, the operation of determining a time slot allocation at 122 may involve receiving user inputs or accessing a memory at a transmitting device, or receiving an indication of the time slot allocation at a receiving device. Transmission of the determined allocation to a receiver at 124 may be accomplished by replacing protocol overhead traffic to be transmitted on the link with allocation information, as described above.

The illustrated operations may also involve different processes at the same interface, depending on whether a multiplexed signal is to be received or transmitted on the link. Signal reception at 126 may entail demultiplexing port signals from a received multiplexed signal, whereas transmission may involve multiplexing port signals. The same or different time slot allocations may be used for demultiplexing and multiplexing, and thus time slot allocation at 122 may be performed by the same interface multiple times.

Further variations of the method 120 may be or become apparent to those skilled in the art, from the above apparatus descriptions for instance.

Figure 11:
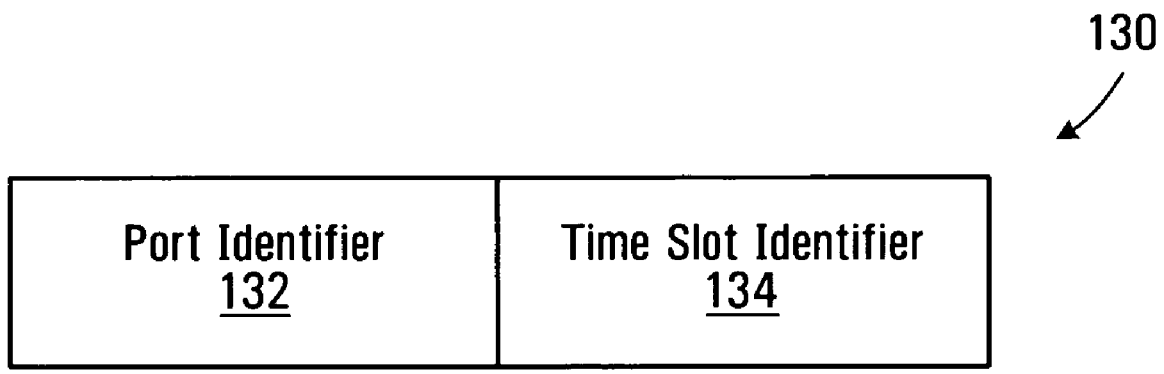
FIG. 11 is a block diagram of a data structure according to another embodiment of the invention.

Aspects of the invention may also be embodied in other forms than apparatus and methods as described above. FIG. 11 is a block diagram of a data structure according to another embodiment of the invention.

The data structure shown in FIG. 11 might be stored in a memory or other machine-readable medium for access by a time slot allocation module 44, 82 and/or a multiplexing module 42, 84 (FIGS. 2, 6). As shown, the example data structure 130 includes a port identifier 132 that identifies a port of a signal processing device, and a time slot identifier 134 that identifies a time slot in a TDM scheme in which a signal associated with the port identified at 132 is to be exchanged with another signal processing device. In one embodiment, the identifiers 132, 134 are numbers, although forms of identifiers are also contemplated.

As described above, multiple port signals may be multiplexed for transfer over a single logical connection, and accordingly a data structure may include multiple port identifiers and corresponding time slot identifiers so as to map ports to time slots. Port/time slot mappings may be stored in pairs as shown in FIG. 11, or in other formats. Where a port has two assigned time slots, for example, this mapping may be stored as two pairs with the same port identifier, or as one data record including the port identifier and two time slot identifiers.

The interfaces and techniques disclosed herein may be used, for example, to logically multiplex up to 10 GMII streams across a single 10 Gb/s link. The multiplex function can be transparent to existing GMII functionality on both the MAC and PHY sides of an interface. If a 10GE operational mode is desired on a MAC port, then an embodiment of the invention allows the interface on the MAC device to operate in either a multiplex mode, for GE ports, or in a non-multiplex mode according to XFI for 10GE, for instance, using the same bit encoding and serializer/deserializer functionality as in the multiplex mode.

What has been described is merely illustrative of the application of principles of embodiments of the invention. Other arrangements and methods can be implemented by those skilled in the art without departing from the scope of the present invention.

For example, the divisions of functions shown in the drawings are not intended to limit the scope of the present inven- In addition, although described primarily in the context of methods and systems, other implementations of the invention are also contemplated, as instructions and data structures stored on machine-readable media, for example.

We claim:

1. An apparatus comprising:
   a time slot allocation module operable to determine an allocation of time slots in a time division multiplexing (TDM) scheme to transfer Ethernet signals associated with ports of a signal processing device;
   a multiplexing module operatively coupled to the time slot allocation module and operable to transfer Ethernet signals associated with a plurality of the ports of the signal processing device between the plurality of ports and another signal processing device over a single local logical Ethernet link in accordance with the determined allocation; and
   a signalling module operatively coupled to the time slot allocation module and operable to exchange an indication of the determined allocation with the other signal processing device on the Ethernet link, the indication comprising allocation information replacing Ethernet protocol overhead traffic on the Ethernet link,
   the multiplexing module being operable to transfer Ethernet signals by demultiplexing Ethernet signals from a multiplexed signal received on the Ethernet link and distributing the demultiplexed Ethernet signals to the plurality of ports in accordance with the determined allocation,
   the signalling module being operable to receive the allocation information in the received multiplexed signal, and to substitute the Ethernet protocol overhead traffic that was replaced by the allocation information in the received multiplexed signal back into the received multiplexed signal to replace the received allocation information.

2. The apparatus of claim 1, wherein the multiplexing module is further operable to transfer Ethernet signals by multiplexing Ethernet signals for transmission on the Ethernet link.

3. The apparatus of claim 2, wherein the multiplexing module is operable to multiplex the Ethernet signals by sequentially transmitting on the Ethernet link blocks of Ethernet signals received from respective ports of the plurality of ports.

4. The apparatus of claim 2, wherein the time slot allocation module is operable to determine respective allocations for use in the multiplexing and the demultiplexing.

5. The apparatus of claim 1, wherein the signalling module is further operable to transmit an indication of an allocation determined for Ethernet signals that are to be transmitted to the other signal processing device on the Ethernet link by replacing Ethernet protocol overhead traffic to be transmitted on the Ethernet link with allocation information.

6. The apparatus of claim 5, wherein the allocation information replacing the Ethernet protocol overhead traffic to be transmitted on the Ethernet link comprises, for each time slot of a plurality of time slots, an identifier of a port allocated to the time slot, a sequence number of a next block of an Ethernet signal, associated with the port, to be transmitted in the time slot, and verification information for checking integrity of the identifier and the sequence number.

7. The apparatus of claim 1, wherein the allocation information comprises, for each time slot of a plurality of time slots, an identifier of a port allocated to the time slot, a sequence number of a next block of an Ethernet signal, associated with the port, to be transmitted in the time slot, and verification information for checking integrity of the identifier and the sequence number, and wherein the signalling module is further operable to check the integrity of the identifier and the sequence number.

8. A method comprising:
   determining an allocation of time slots in a time division multiplexing (TDM) scheme to transfer Ethernet signals associated with ports of a signal processing device,
   transferring Ethernet signals associated with a plurality of the ports of the signal processing device between the plurality of ports and another signal processing device over a single local logical Ethernet link in accordance with the determined allocation,
   exchanging an indication of the determined allocation with the other signal processing device on the Ethernet link, the indication comprising allocation information replacing Ethernet protocol overhead traffic on the Ethernet link,
   the transferring comprising demultiplexing the Ethernet signals from a multiplexed signal received on the Ethernet link and distributing the demultiplexed Ethernet signals to the plurality of ports in accordance with the determined allocation,
   the exchanging comprising receiving the allocation information in the received multiplexed signal,
   the determining comprising determining the allocation from the received allocation information,
   the method further comprising:
   substituting the Ethernet protocol overhead traffic that was replaced by the allocation information in the received multiplexed signal back into the received multiplexed signal to replace the received allocation information.

9. The method of claim 8, wherein transferring further comprises transmitting Ethernet signals on the Ethernet link.

10. The method of claim 9, wherein exchanging further comprises transmitting an indication of an allocation determined for Ethernet signals that are to be transmitted to the other signal processing device on the Ethernet link by replacing Ethernet protocol overhead traffic to be transmitted on the Ethernet link with allocation information.

11. The method of claim 9, wherein transmitting comprises multiplexing Ethernet signals for transmission on the Ethernet link, wherein determining comprises determining respective allocations for use in the multiplexing and the demultiplexing.

12. A non-transitory machine-readable medium storing instructions which when executed perform the method of claims 8.

13. An apparatus comprising:
   a time slot allocation module operable to dynamically determine an allocation of time slots in a time division multiplexing (TDM) scheme to transfer signal packets associated with ports of a signal processing device;
   a signalling module operatively coupled to the time slot allocation module and operable to transfer on a logical link an indication of a current allocation, the indication comprising allocation information replacing protocol overhead traffic in a transfer protocol supported by the logical link; and
   a multiplexing module operatively coupled to the time slot allocation module and operable to transfer packets associated with a plurality of the ports between the plurality of ports and the logical link in accordance with the current allocation, the multiplexing module being operable to transfer packets by demultiplexing packets from a multiplexed signal received on the logical link and distributing the demultiplexed packets to the plurality of ports in accordance with the current allocation, the signalling module being operable to receive the allocation information in the received multiplexed signal, and to substitute the protocol overhead traffic that was replaced by the allocation information in the received multiplexed signal back into the received multiplexed signal to replace the received allocation information.

14. The apparatus of claim 13, wherein the signalling module is further operable to transmit an indication of an allocation determined for packets that are to be transmitted on the logical link by replacing protocol overhead traffic to be transmitted on the link with the allocation information.

15. The apparatus of claim 13, wherein the allocation information comprises, for each time slot of a plurality of time slots, an identifier of a port allocated to the time slot, a sequence number of a next packet of a signal, associated with the port, to be transmitted in the time slot, and verification information for checking integrity of the identifier and the sequence number.

16. The apparatus of claim 13, the multiplexing module being further operable multiplexing packets for transmission on the link, wherein the time slot allocation module is operable to dynamically determine respective allocations for use in the multiplexing and the demultiplexing.

17. The apparatus of claim 13, wherein the packets comprise Ethernet packets.

18. The apparatus of claim 13, wherein the packets comprise Fibre Channel packets.

19. A method comprising:

dynamically determining an allocation of time slots in a time division multiplexing (TDM) scheme to transfer signal packets associated with ports of a signal processing device;

transferring on a logical link an indication of a current allocation, the indication comprising allocation information replacing protocol overhead traffic in a transfer protocol supported by the logical link; and transferring packets associated with a plurality of the ports between the plurality of ports and the logical link in accordance with the current allocation, the transferring packets comprising demultiplexing the packets from a multiplexed signal received on the logical link and distributing the demultiplexed packets to the plurality of ports in accordance with the current allocation, the transferring an indication comprising receiving the allocation information in the received multiplexed signal, the dynamically determining comprising determining the current allocation from the received allocation information, the method further comprising:

substituting the protocol overhead traffic that was replaced by the allocation information in the received multiplexed signal back into the received multiplexed signal to replace the received allocation information.

20. The method of claim 19, wherein transferring the indication further comprises replacing protocol overhead traffic to be transmitted on the link with the allocation information.

21. The method of claim 19, wherein the allocation information comprises, for each time slot of a plurality of time slots, an identifier of a port allocated to the time slot, a sequence number of a next packet of a signal, associated with the port, to be transmitted in the time slot, and verification information for checking integrity of the identifier and the sequence number.

22. The method of claim 19, wherein transferring packets further comprises multiplexing the packets for transmission on the link, and wherein the dynamically determining comprises determining respective allocations for use in the multiplexing and the demultiplexing.

* * * * *

UNITED STATES PATENT AND TRADEMARK OFFICE
CERTIFICATE OF CORRECTION

| | | |
|---|---|---|
| PATENT NO. | : 7,787,502 B1 | Page 1 of 1 |
| APPLICATION NO. | : 11/477663 | |
| DATED | : August 31, 2010 | |
| INVENTOR(S) | : Fredrik Olsson et al. | |

It is certified that error appears in the above-identified patent and that said Letters Patent is hereby corrected as shown below:

In The Claims:

Column 14, Claim 12, Line 53, "claims" should read --claim--.

Column 15, Claim 16, Line 28, insert --to transfer packets by-- between "operable" and "multiplexing".

Signed and Sealed this

Fourteenth Day of December, 2010

David J. Kappos
*Director of the United States Patent and Trademark Office*